H. E. PARKER.
BIT CHUCK.
APPLICATION FILED NOV. 12, 1917.
1,270,754.
Patented June 25, 1918.
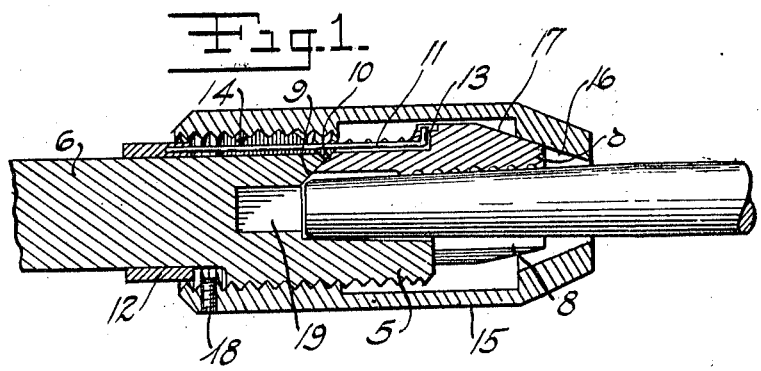
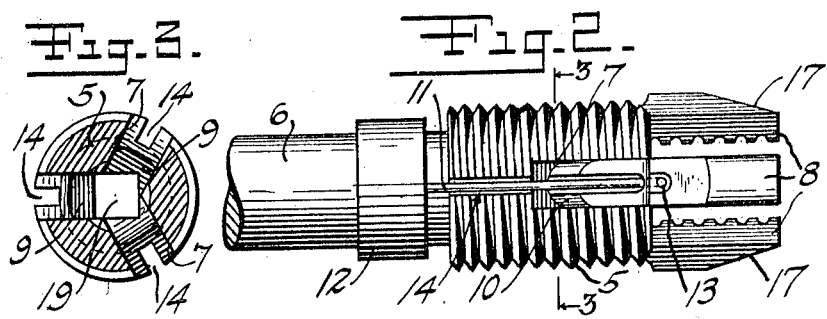
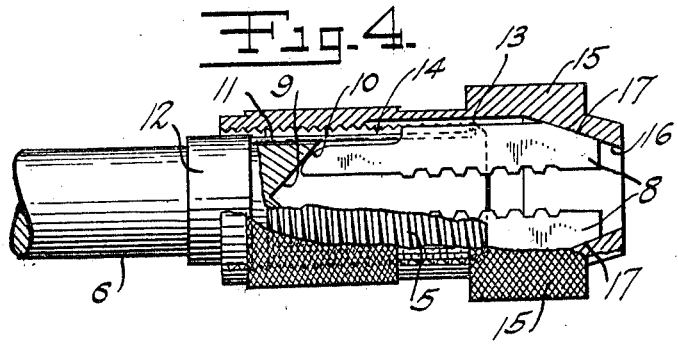
Inventor
Harry E. Parker.
By his Attorneys

UNITED STATES PATENT OFFICE.

HARRY E. PARKER, OF NEW BRITAIN, CONNECTICUT, ASSIGNOR TO THE STANLEY RULE & LEVEL COMPANY, OF NEW BRITAIN, CONNECTICUT, A CORPORATION OF CONNECTICUT.

BIT-CHUCK.

1,270,754.      Specification of Letters Patent.      Patented June 25, 1918.

Application filed November 12, 1917. Serial No. 201,420.

*To all whom it may concern:*

Be it known that I, HARRY E. PARKER, a citizen of the United States of America, residing at New Britain, Connecticut, have invented a new and useful Bit-Chuck, of which the following is a specification.

This invention relates particularly to chucks for bits, drills and the like.

One of the principal objects of the invention is to provide simple and effective means for positioning the chuck jaws in such a way as to enable them to adjust and fit themselves to various forms of drill shanks, such as the cylindrical, tapered and squared shanks now in common use.

Another object is to simplify and improve the construction of the chuck generally.

Briefly stated the invention comprises a stock or body member formed to take the chuck jaws and provided with beveled jaw closing shoulders for engagement with the inner ends of the jaws, a ring slidably engaged on the stock and connected with the jaws for positioning the same and means, usually in the form of an interiorly threaded sleeve, engaged over the stock for closing the jaws upon the object engaged therebetween.

The accompanying drawing illustrates the invention embodied in two practical forms but I would have it understood that various modifications and changes may be made without departing from the true spirit and scope of the invention.

In this drawing:—

Figure 1, is a longitudinal sectional view of a 3-jaw type of tool chuck embodying the invention and illustrating the action in gripping a tapered tool shank therein.

Fig. 2, is a plan view with the jaw closing sleeve removed.

Fig. 3, is a cross sectional view taken substantially on the plane of the line 3—3 of Fig. 2.

Fig. 4, is a broken sectional view of a two-jaw form of chuck.

The stock or body of the chuck is constructed in the present disclosure as an exteriorly screw threaded head 5 having a rearwardly extending relatively smooth shank portion 6. The head of the stock is longitudinally slotted at 7 to take the chuck jaws 8, there being three such slots and jaws in the first form illustrated and only two in the second form, shown in Fig. 4.

Adjacent the inner ends of the jaw holding slots the head of the stock is formed with inwardly convergent beveled jaw closing shoulders 9 and usually the inner ends of the jaws are also beveled as indicated at 10 so as to work smoothly over said jaw closing surfaces.

The jaws are positioned and at the same time held so that they may accommodate themselves to different forms of tool shanks by means of the spring arms 11 carried by the ring 12, said ring sliding freely over the relatively smooth shank of the stock. The spring arms may simply consist of spring rods or wires as illustrated embedded in one end in the sliding ring 12 and hooked at their opposite ends to engage in sockets 13 provided therefor in the jaws. These spring arms work in passages 14 extending from the jaw receiving slots 7 rearwardly to the shank portion of the stock, said passages being shown formed simply as open slots cut in the rearward part of the threaded head. These guiding slots or passages serve also as means for preventing rotation of the sliding ring or twisting of the spring jaw carrying arms.

The jaw closing means comprises in the present disclosure an interiorly screw threaded sleeve 15 engaged over the threaded head of the stock and having a beveled or conical jaw closing throat 16 at its outer end for engaging over the beveled outer ends 17 of the jaws.

From the foregoing it will be seen that as the sleeve 15 is rotated in a jaw closing direction the beveled jaw closing surface 16 is engaged with the jaws in a manner to contract them upon the inserted tool shank and also to force them longitudinally in their guide grooves so as to thereby bring the beveled jaw closing surfaces 9 into action to also contract the inner ends of the jaws upon the inserted tool. In this way both ends of the jaws are forced firmly into engagement with the tool shank and at the same time the jaws are permitted a certain independent movement which enables them to adjust themselves to the shape of the particular tool. During these self-adjustments of the chuck jaws the ring 12 can slide freely over the tool shank by reason of which the adjustment of the several jaws is made simultaneous. The ring 12 and the spring jaw supporting arms thus form in effect a floating support for the jaws enabling them to accurately center any shape of tool shank introduced into the chuck.

The opening movement of the jaws may be limited by providing a stop screw 18 on the sleeve disposed normally over the reduced shank portion of the stock and engaging as the sleeve is turned, with the enlarged or head portion of the stock. By loosening or removing this screw it will be apparent that the sleeve may then be removed to give access to the jaws and other parts.

If desired a squared or angular shaped socket 19 may be provided in the inner end of the head to take the squared or angular shaped head of a tool shank.

It will be apparent that the chuck of my invention is of a very simple construction, that the parts are few in number and not liable to become misplaced or get out of order and further that the jaws are accurately centered and firmly hold different shapes of tool shanks.

I claim:—

1. A bit chuck comprising a stock having an externally screw-threaded head and a relatively smooth shank in rear of said head, said head being longitudinally slotted to receive the chuck jaws and having passages extending from the inner ends of said slotted portions to the relatively smooth shank, chuck jaws seated in said slots, a positioning ring freely slidable on the shank of the stock, arms carried by said ring and extending through the passages aforesaid into engagement with the respective chuck jaws, and a jaw closing sleeve engaged on the screw threaded head of the stock.

2. A bit chuck comprising a stock having an externally screw-threaded head and a relatively smooth shank in rear of said head, said head being longitudinally slotted to receive the chuck jaws and having passages extending from the inner ends of said slotted portions to the relatively smooth shank, chuck jaws seated in said slots, a positioning ring freely slidable on the shank of the stock, arms carried by said ring and extending through the passages aforesaid into engagement with the respective chuck jaws, a jaw closing sleeve engaged on the screw threaded head of the stock, and a stop screw carried by the jaw closing sleeve normally overlying the smooth shank of the stock and engaging with the threaded head thereof to limit the outward movement of the sleeve on the head.

3. A bit chuck comprising a stock having an externally screw-threaded head and a relatively smooth shank in rear of said head, said head being longitudinally slotted to receive the chuck jaws and having passages extending from the inner ends of said slotted portions to the relatively smooth shank, chuck jaws seated in said slots, a positioning ring freely slidable on the shank of the stock, arms carried by said ring and extending through the passages aforesaid into engagement with the respective chuck jaws, a jaw closing sleeve engaged on the screw-threaded head of the stock and beveled jaw-closing shoulders on the stock engaging the inner end portions of the chuck jaws.

HARRY E. PARKER.

Copies of this patent may be obtained for five cents each, by addressing the "Commissioner of Patents, Washington, D. C."